(12) United States Patent
DeGroff et al.

(10) Patent No.: US 8,132,471 B2
(45) Date of Patent: Mar. 13, 2012

(54) FAIL-SAFE PITOT COVER FOR A VARIETY OF PITOT DESIGNS

(76) Inventors: Steven A. DeGroff, Decatur, IN (US); Samuel S. Conte, Ft. Wayne, IN (US)

( * ) Notice: Subject to any disclaimer, the term of this patent is extended or adjusted under 35 U.S.C. 154(b) by 347 days.

(21) Appl. No.: 12/587,138

(22) Filed: Oct. 2, 2009

(65) Prior Publication Data

US 2010/0089147 A1    Apr. 15, 2010

Related U.S. Application Data

(60) Provisional application No. 61/195,105, filed on Oct. 3, 2008.

(51) Int. Cl.
*G01F 1/46* (2006.01)

(52) U.S. Cl. .................................................. 73/861.65
(58) Field of Classification Search ................ None
See application file for complete search history.

(56) References Cited

U.S. PATENT DOCUMENTS

| 5,127,265 A | 7/1992 | Williamson et al. ............ 73/182 |
| 5,938,147 A | 8/1999 | DeGroff ......................... 244/1 R |
| 6,612,521 B1 | 9/2003 | DeGroff ......................... 244/1 R |

*Primary Examiner* — Harshad Patel
(74) *Attorney, Agent, or Firm* — Robert G. Lev (57) ABSTRACT

A pitot cover is provided with fail-safe removable operation from a pitot tube by virtue of a number of different removal structures. Foremost among these is an elastomeric band which holds two halves of the pitot cover to the pitot tube. The band is separated by an adhesive strip, part of which lies on the pitot tube and melts at less than 230° F. or less.

18 Claims, 6 Drawing Sheets

FAIL-SAFE PITOT COVER FOR A VARIETY OF PITOT DESIGNS

PRIORITY INFORMATION

The present invention claims priority to U.S. Provisional Application No. 61/195,105 filed on Oct. 3, 2008, making reference herein to same in its entirety.

FIELD OF INVENTION

The present invention generally relates to covers for pitot probes and techniques for rendering the use of such covers safe under a variety of circumstances. In particular, the present invention is directed to an easily-removed pitot probe cover, and techniques for automatically and safely removing that cover under a variety of circumstances.

BACKGROUND ART

Pitot probes are used to detect air speed so that accurate measurements of air speeds can be provided to the pilots of aircraft. Normally pitot probes have a pitot tubes extending forward from the aircraft in various front-mounted locations. Pitot probes have an opening at the front at the tip of the tube or most-forward portion of the probe. There are also drain holes in other locations on the body of the probe. In operation the pitot is configured to allow a slip stream of air to enter the front hole and then to an airspeed indicator within the aircraft. This indicator is an instrument that measures air pressure from the pitot probe and then translates it into airspeed.

If any of the holes on the pitot probe become clogged or otherwise plugged, the probe can be rendered non-functional. Such a condition renders the operation of any aircraft to be very unsafe. Because of the criticality of pitot probes, they are usually covered to prevent water, dirt or insects from entering the openings. It is conventional operating procedure for the covers to remain on the probes whenever the aircraft is not in use.

Conventional pitot probe covers are of two general types: heat-resistant devices; and, devices that are not heat-resistant. The heat-resistant devices typically have metal components and/or rigid high-heat resistant ceramic materials. However, most conventional pitot covers are not meant to be used in heated environments.

Examples of conventional pitot covers are found in U.S. Pat. Nos. 5,938,147, and 6,612,521, both to DeGroff (one of the inventors of the present application). Both subject patents are incorporated herein by reference, as examples of pitot tube covers for non-heated environments.

Conventionally, pitot probe covers are manually installed on the pitot tubes after flight, and then removed prior to the next flight. This is also true for the pitot covers capable of withstanding high temperature. Both types are removed as part of standard aircraft system checks and power-up.

Typically, pitot covers have warning devices. One example is a colored ribbon or streamer, with an imprinted message indicating that the device should be removed before flight. Also, standard pre-flight check lists typically include the removal of pitot tube covers. Part of the pre-flight check list involves initiating the flow of heated air from the aircraft into the pitot probe for purposes of clearing the probe. This is done by using sufficiently hot air so that contaminates are removed by incineration or vaporization. The temperature of the air going into the pitot probe and through its tube can reach over 800° F. Unfortunately, this can melt or fuse a non-heat resistant pitot cover. The result is that the pitot tube becomes clogged, rendering the aircraft unsafe for use.

Many conventional pitot tube covers, such as those discussed in the patents previously incorporated herein by reference, are not designed for high temperatures, and such designs can fail on heated pitot tubes. Even specifically designed heat-resistant pitot covers can fall under some circumstances.

Even if a pitot tube cover is not fused by the hot air induced in the pitot tube, and separates easily due to air pressure, a loose pitot cover or parts thereof can be sucked into the aircraft engine causing substantial damage. This possibility poses an even greater danger than failure of airspeed indication. Even if the damage caused is not fatal, substantial maintenance problems very often result.

Accordingly, the conventional art of pitot covers admits to substantial improvement. Such improvements would provide pitot covers that are automatically removed from pitot tubes, will not fuse to pitot openings, and cause no hazard to aircraft engines. The most desirable pitot cover system is one that is always fail-safe with regard to being automatically removed at the appropriate time.

SUMMARY OF INVENTION

It is a primary object of the present invention to provide a pitot cover that is a substantial improvement over conventional pitot covers, overcoming the flaws and limitations thereof.

It is another object of the present invention to provide a reusable pitot probe cover with multiple means of automatic self disengagement.

It is a further object of the present invention to provide a pitot probe cover having multiple fail-safe mechanisms.

It is an additional object of the present invention to provide a pitot tube cover of sufficient durability that it can be reused many times, even if inadvertently left on the pitot tube after aircraft power-up.

It is still another object of the present invention to provide a pitot probe cover that will not fuse or otherwise clog apertures on the pitot probe.

It is yet a further object of the present invention to provide a pitot probe cover that will not pose a threat to aircraft engines.

It is again an additional object of the present invention to provide a pitot probe cover that includes multiple structures for automatic self-removal.

It is still another object of the present invention to provide a pitot probe cover that can automatically be removed at relatively low temperatures, and avoids overheating of the pitot.

It is yet a further object of the present invention to provide a pitot probe cover that automatically disengages upon engine start up or the initial taxi phase of aircraft operation.

It is still an additional object of the present invention to provide a pitot probe cover that can be easily removed using relatively low (28 volt) heater activation.

These, and other goals and objects of the present invention, are achieved by a removal cover for an elongated pitot tube having an open end. The removable cover includes two halves of a shell covering at least a portion of the pitot tube and the open end of the pitot tube. An elastomeric band, having two opposed ends, is arranged to hold the two halves of the shell together around at least a portion of the pitot tube. Also included is a plurality of structures arranged for automatically removing the cover from the pitot tube.

Another embodiment of the present invention achieves the aforementioned goals and objectives using a method of removing a pitot cover from the pitot tube. The cover is held to at least a portion of the pitot tube by an elastomeric band having opposing ends held together by an adhesive strip so that the elastomeric band is under tension. The method includes the steps of firstly heating the pitot tube, and then melting the adhesive strip to release the elastomeric band.

A third embodiment of the present invention is directed to a binding structure for holding and releasing a pitot tube cover from a pitot tube. The pitot tube cover includes two shell halves held together over the pitot tube by the binding structure which is constituted by a elastomeric band having two opposing ends. There is a predetermined gap between the opposing ends and an adhesive strip is arranged between and holding the opposing ends of the bands together.

DETAILED DESCRIPTION OF PREFERRED EMBODIMENT

A first embodiment of the present invention, as depicted in FIGS. 1-9, is an automatic self-removing pitot probe cover. The structure of the invention includes multiple removal mechanisms so that if one should fail, the others will function in a predetermined sequence. The drawings depict a number of the redundant (and sequential) functionalities of the present invention that render it reusable in many circumstances, and entirely fail-safe in all circumstances.

It should be understood that while a particular size and interior shape of the pitot cover is depicted in the drawings, the present invention is not necessarily limited thereby. Rather, the overall size and shape of the probe cover can be selected to fit a particular size and shape of pitot tube. It is the functional characteristics rather than the precise size and shape of the pitot probe cover that constitute the present invention. The precise structure, as depicted in the drawings, is required only when absolutely necessary to effect the required functionality of the present invention.

Figure 1:
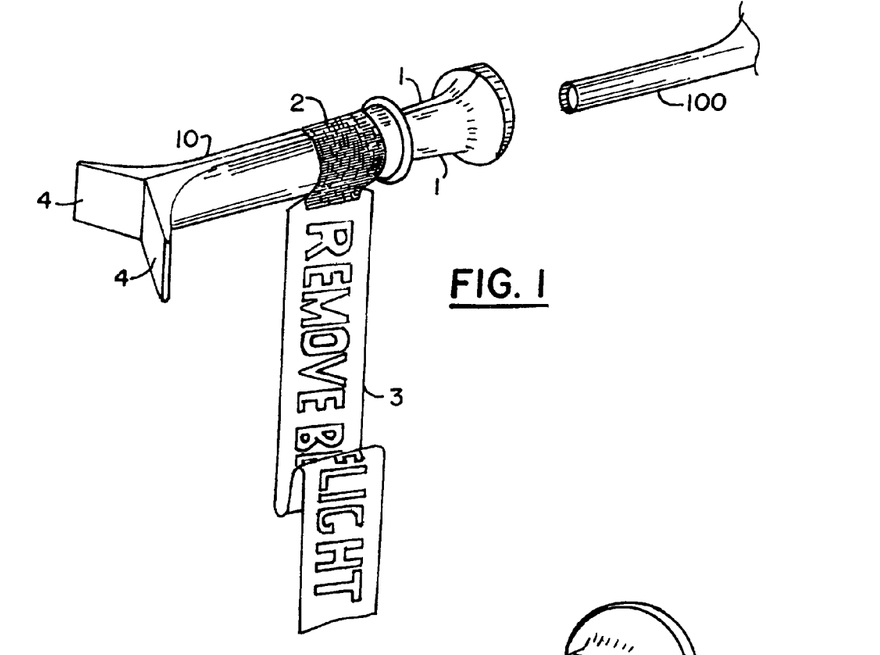
FIG. 1 is a perspective view of the present invention, depicting certain functional aspects thereof.

The pitot cover 10 depicted in FIG. 1 appears as a partially hollow shell with a wall structure 7, which is configured to fit over a pitot tube 100, preferably the cover 10 has been sized and configured for the pitot 100. However, a precise fit between the cover 10 and the pitot tube 100 is not essential for the operation of the present invention. Rather, the present invention can accommodate a substantial level inaccuracy regarding the fit of cover 10 on pitot tube 100. The wall structure 7 of the cover 10 flexes and provides a great deal of latitude with regard to the fit of the cover 10 over the pitot tube 100. The extended concavity 9 also provides additional flexibility with regard to fit of the cover 10 on the pitot tube 100.

The pitot tube cover 10 is formed in two halves, 1, 1 which are held together by an elastomeric band 2, preferably made of polypropylene or similar elastomeric material. The elastomeric band 2 is placed around the pitot tube cover 10 by joining the two ends of the elastomeric band in a "butt" configuration, connected by a glue or other adhesive. Usually such a joint is effected by soaking the adhesive into the two ends of the elastomeric band to form the bond. However, this is simply one embodiment of the present invention. Other embodiments of the present invention incorporate other techniques for attaching the opposing ends of the elastomeric band 2 with each other as will be described infra.

In operation, the pitot cover 10 is placed over the pitot 100 with open end 8 extending over the increasing thickness of pitot 100, following conventional protocols. When such protocols (removal of cover 10 immediately before engine startup) are strictly followed, the inventive details of the present pitot cover are not crucial. However, when the proper preflight protocols are not followed, the fail-safe arrangements of the present invention become extremely important for the safety of the aircraft, which requires a clear, functional pitot tube.

Figure 2:
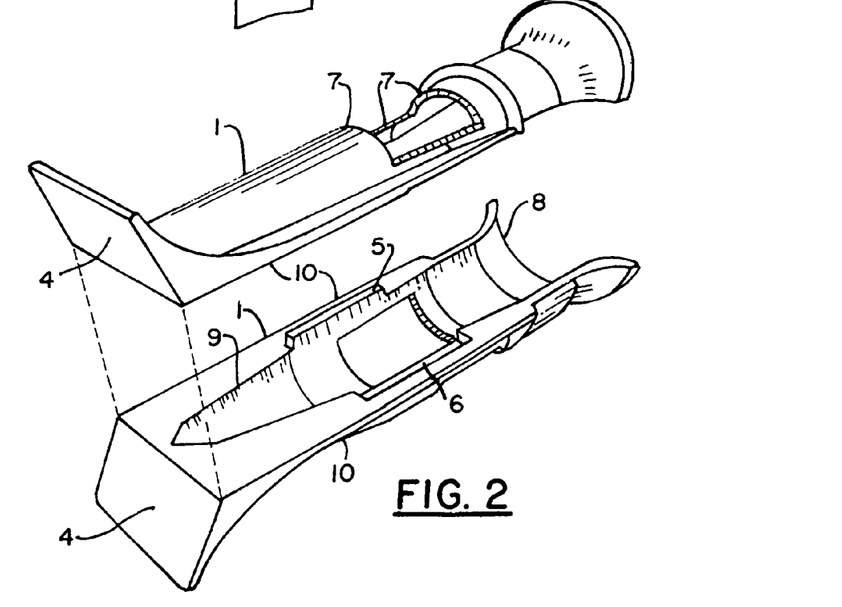
FIG. 2 is a perspective view depicting two separated body halves of the pitot probe cover of the present invention.

The first level of functionality is best illustrated in FIG. 2, which depicts the semi-cylindrical interior configuration of the pitot cover 10. The semi-cylindrical interior space 9 extends well beyond the place where the pitot tube 100 would extend into the pitot cover 10. As a result, there is room for air to build up within extended hollow concavity 9 in the pitot cover 10 wall 7 structure to allow air from the pitot to exert a force on the cover 10 much further from the pitot 100 and help to blow the pitot cover 10 away from the pitot 100. The force of the air blown into the pitot cover should blow away the pitot long before various melting processes can take place. Under such conditions, the pitot cover will easily be reusable since there has not been time for the hot air from the pitot to melt the cover. Further, the material of the cover 10 is resilient so that no damage occurs due to impact of the pitot cover with the ground.

The streamer 3 attached to the elastomeric band 2 serves two purposes. Firstly, it is a reminder to maintenance crews to remove the pitot cover during the standard pre-flight check sequence. Secondly, it aids in the retrieval of the pitot cover after it has been deposited on the ground due to any one of a number of different operations (such as the pitot air blowing the cover 10 away from the pitot tube 100).

If, for some reason, the pitot cover 10 remains on the pitot tube 100 after the initial blast of hot air, a first melting operation will occur, in particular at the elastomeric band 2. Since this band is selected from a material that will melt at approximately 300° F. (such as neoprene and the like), the elastomeric band will separate long before the rest of the pitot cover 10 begins to disintegrate due to the heat. Even a partial stretching or separating of the elastomeric band 2 may cause pitot cover to loosen and fall away from the pitot tube 100.

Separation of the cover 10 from the pitot tube 100 is further facilitated by the nature of the cover 10 as a structure split longitudinally into halves 1, 1. The halves fit together closely and have an inner extended cavity 9, part of which tightly fits around the pitot tube 100. Accordingly, once the elastomeric band 2 has separated or been disintegrated, the two halves, 1, 1 of the cover 10 should fall away from each other. However, this does not necessarily happen in all cases, often due to the surface tension between the mating surfaces of protrusion 5, and receiving indentation 6 of the two halves 1, 1, or adhesion between the interior wall 7 surfaces of the pitot cover 10 and the pitot tube 100. Because of the shape and tight fit part of extended concavity 9 in the two halves 1, 1 of the cover 10, an effective press fit with the pitot tube might be effected. Partially melted or burnt debris blown from the pitot tube 100 itself may further serve to help hold the cover 10 to the tube 100. Heat expansion of both the tube and the cover may result in a much tighter press fit than originally expected based upon tube and cover sizes. Finally, the pitot tube cover 10 may be too small for the pitot tube 100 so that overly tight fit is forced when placing the pitot tube cover 10 over the pitot tube 100.

Figure 3:
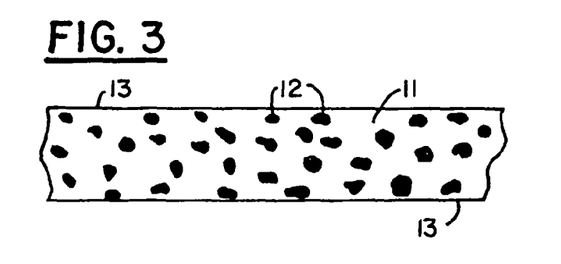
FIG. 3 is an interior view, depicting the distribution of different materials throughout the structure.
Figure 4:
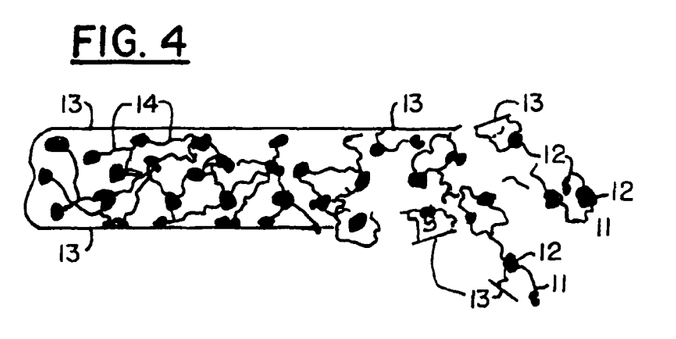
FIG. 4 is a graphic representation depicting disintegration of the structure depicted in FIG. 3.
Figure 5:
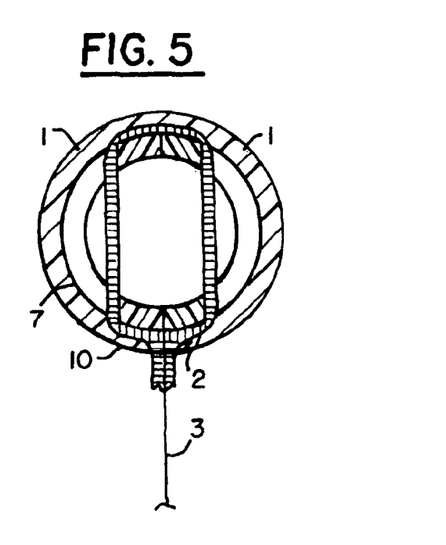
FIG. 5 is a cross sectional view, depicting the mounting of the present invention on a pitot probe.
Figure 6:
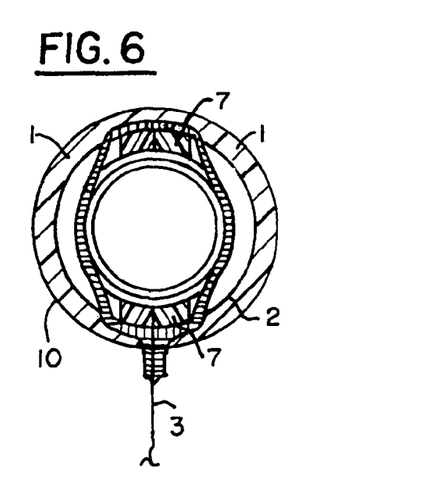
FIG. 6 is a cross sectional view, depicting deformation of the pitot probe cover of FIG. 5.
Figure 7:
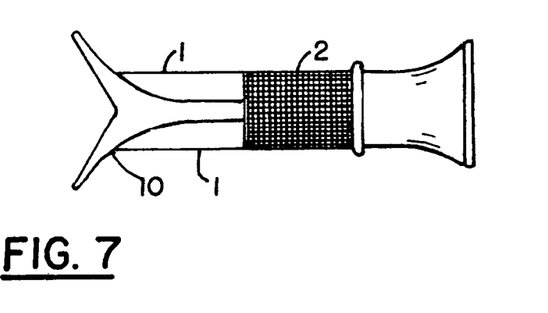
FIG. 7 is a top view of one embodiment of the present invention.
Figure 8A:
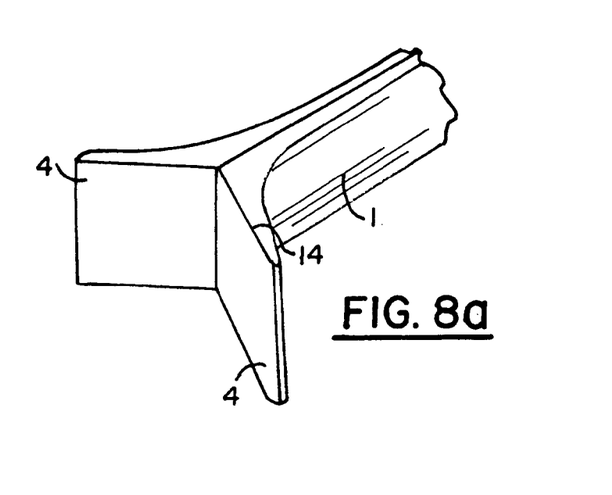
FIG. 8(a) is a perspective view of one end of the structure depicted in FIG. 7.
Figure 8B:
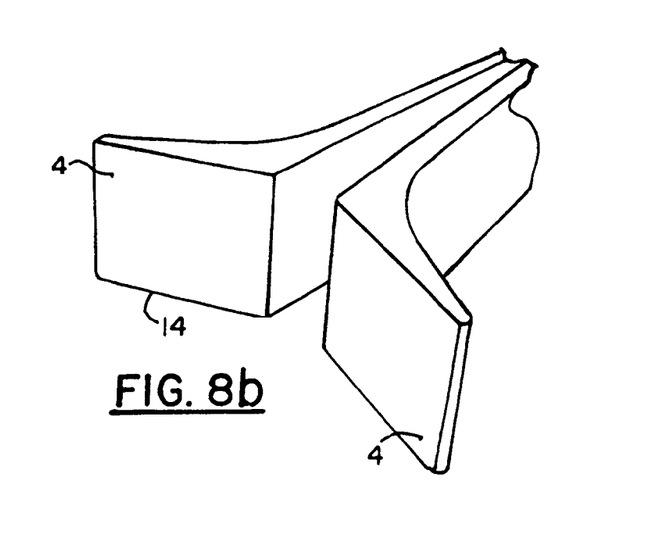
FIG. 8(b) is a perspective view of the structure of FIG. 8(a), depicting one functional attribute of that structure.

If the pitot cover 10 remains attached to the pitot tube 100 past the stage where the elastomeric band 2 disintegrates (and air blown from the pitot tube has been unsuccessful in removing cover 10), additional self removal mechanisms are available with the present invention. The first mechanism resides in the material itself. The material is a composite as depicted in FIGS. 3 & 4, and constitutes a frangible material. This material will disintegrate (as depicted in FIG. 4) should the cover remain upon the heated pitot tube for any length of time beyond the melting of the elastomeric band 2. The material is such that it rapidly absorbs the radiant heat from the pitot tube 100 and rapidly disintegrates due to melting and self-charring. This charring reduces the entirety of the structure to an end product that will not stick to the exterior of the pitot tube 100. Further, the resulting material is reduced into small, non-damaging fragments that will not clog or otherwise damage aircraft engines if entering in the engine intake.

The new material used to constitute the pitot cover has been tested and found to be non-destructive of engine interiors. This material is approximately 67.2% walnut shell and wood flour, 27% polypropylene, and 5.8% sodium serrate. This material tends to shrink into a molten mass when subject to extended exposure to hot air (approximately 350°-500° F.) from the pitot tube 100 (which is heated to 800°-900° F.). Further, it develops a self-charring, which is self-insulating and non-flammable. The material will not stick to metallic surfaces. Also, as the material chars, it disintegrates into ever smaller particles, which easily blow away from the moving aircraft.

While a preferred embodiment of the cover 10 material has been specified, other proportions of those materials can be used to achieve the novel results and advantages of the subject pitot cover. The cover 10 is preferably manufactured using an injection molding process, well-known in the plastics and related industries. Before molding, the material can be combined in a conventional screw mixer in a conventional manner. Consequently, the pitot tube cover 10 of the present invention is easily manufactured using easily-obtained materials. The resulting composite material is depicted in FIG. 3, and includes a base material 11 encompassing a randomly distributed filler material 12. Also included is a self-skinning outer layer 13, which quickly disintegrates under the previously-described circumstances.

Disintegration of the subject material is enhanced by impact from external forces. Such impact causes a distribution of stresses throughout the material as manifested by the random paths of cracks (shown by the non-linear fracture lines 14). These fracture paths or cracks will stop at each particle 11 or filler 13, or the surface skin 13, and be redirected. This leads to disintegration of the cover 10 material into random smaller particles (11 as depicted in FIG. 4).

Other stresses induced throughout the pitot cover 10 can be caused by elastomeric band 2. The tension of the band 2 is further transmitted in the pitot cover 10 body due to the fact that the body is split into two halves, 1, 1 so that stresses can be effectively induced at the split in the pitot cover body. Because band 2 is elastomeric in nature, it can be placed around the pitot cover 10 with sufficient force so that the pitot cover is distorted by the gripping force as depicted by radial force vectors, in FIG. 6. These radial forces help to work the pitot cover 10 off of the pitot 100. The flexing effected by the elastomeric band on the pitot cover 10 also helps to loosen any surface tension bonds that develop between the cover 10 and pitot tube 100, and to loosen any effective press fitting that might occur between the pitot tube 100 and a very tight cover 10.

The tightness of the elastomeric band 2 around pitot cover 10 also helps to transmit the heat that will melt the band. It should be noted that the band will melt at approximately 300° F. while the cover does not begin to disintegrate until approximately 350°-500° F. Both of these temperatures are achieved using a 110 volt heater (not shown) for the pitot tube 10. In the alternative, 28 volt heaters are also available, but only can achieve pitot tube temperatures of approximately 100°-230° F.

As previously indicated, increasing temperatures applied to the pitot tube cover 10 work along with external forces applied to that cover for its removal from pitot 100. Another source for developing tension on and within the pitot cover 10 is the air pressure generated when the aircraft is in motion. This pressure can be used to help remove the pitot cover by virtue of wind surfaces 4. The surfaces are rectangular and flat, with substantially flat sides. They are displaced at an angle to the center line between the two halves 1, 1 of the body of the pitot cover 10. Even if the pitot cover has melted to the pitot 100, the wind surfaces 4 will be the last to melt and will still be able to develop pressure on the rest of the cover, to peel it away from the pitot 100.

If the elastomeric band 2 has been sufficiently weakened or removed, then the effects of the air pressure from the moving aircraft will force the two halves 1, 1 of the pitot cover 10 away from each other, even before the body of the cover begins to disintegrate. This will allow it reuse of the shell halves 1, 1.

FIGS. 9(*a*)-9(*d*) depict one possible sequence of automatic self-disengagement of the inventive pitot cover 10 from a pitot probe 100. While the sequence depicted in the subject drawings represents the operation of one embodiment of the present invention, the present invention is not limited thereto. Accordingly, different sequences of operation are permitted within the concept of the present invention. Further, while elastomeric band 2 parts at approximately 300° F., and the material of the cover disintegrates at approximately 800° F., these limitations are not required for all embodiments.

Figure 9A:
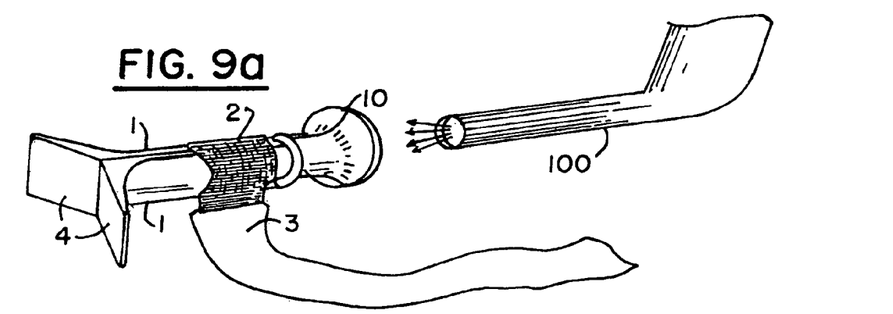
FIG. 9(a) is a perspective view of one embodiment of the present invention, depicting its functional relationship with its environment.
Figure 9B:
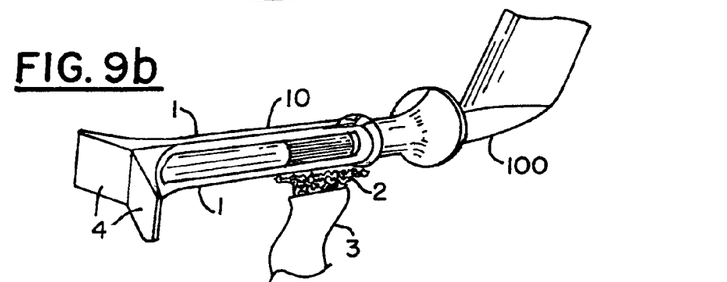
FIG. 9(b) is a perspective view of the present invention in its operational environment, and depicting one function of the present invention.
Figure 9C:
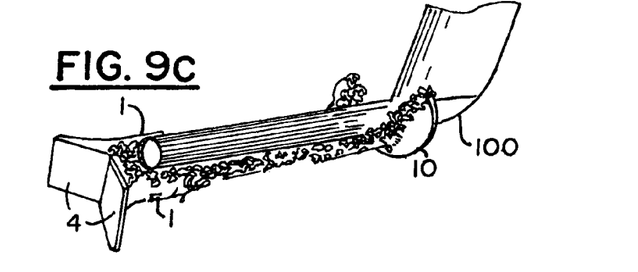
FIG. 9(c) is a perspective view of the present invention in its operational environment, depicting another function of the present invention.
Figure 9D:
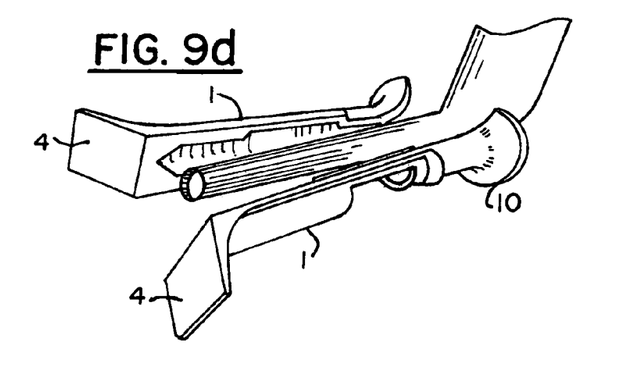
FIG. 9(d) is a perspective view of the present invention in its operational environment, depicting yet another function thereof.
Figure 10:
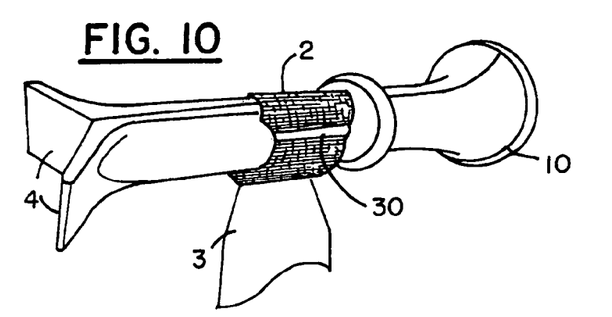
FIG. 10 is a perspective view of another embodiment of the present invention.
Figure 11A:
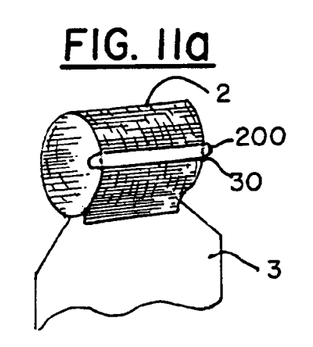
FIG. 11(a) is a detailed view of the elastic band used with the pitot cover of FIG. 10.
Figure 11B:
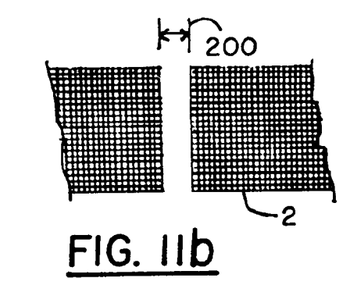
FIG. 11(b) is a front detailed view of the elastic band depicted in FIG. 11(a).
Figure 11C:
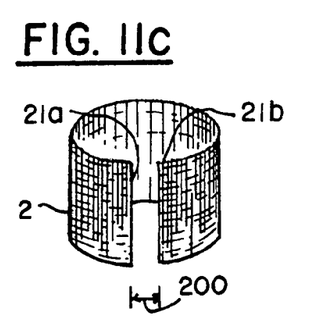
FIG. 11(c) is a perspective view of the elastic band depicted in FIG. 11(a).

The first self-removal step is depicted in 9(*a*). The pitot cover 10, which had previously been in place on the pitot probe 100, is blown off the probe by a rush of hot air, which is typically used to clean out the apertures of the probe. At this point, elastomeric band 2 has not been sufficiently degraded as to part, and still contains ribbon tag 3, which reminds maintenance crews to remove the pitot cover 10 or help them retrieve the cover once it has been blown away from the aircraft.

The next step (if the pitot cover 10 remains on the pitot tube 100) is depicted in FIG. 9(*b*). In this step sufficient hot air has entered the interior of the pitot cover to raise the temperature of the elastomeric band 2 to approximately 300° F. so that the band 2 parts. It should be noted that the band 2 may be selected from a material that degrades at a lower temperature. In the alternative, the band may also be structurally configured so that it may part under pressure of the air from the pitot tube 100, or further pressure developed from air surfaces 4. Further, a gentle tug on ribbon 3 may be sufficient to remove elastomeric band 2 and allow the two halves 1, 1 of the pitot cover 10 to part.

FIG. 9(*c*) depicts a situation in which the pitot cover 10 has remained firmly around the pitot tube 100, even after elastomeric band 2 has deteriorated and no longer functions. The preferred material previously described will deteriorate once the temperature around the pitot tube 100 and inside of the cover 10 reaches approximately 800° F. In this situation, the frangible material of the pitot tube cover simply disintegrates as a charred melt, and falls away from the pitot tube 100 in a number of small, innocuous pieces.

FIG. 9(*d*) depicts the parting of the two halves 1, 1 of the pitot cover 10 due to air pressure developed on surfaces 4, forcing the two halves apart. While each of the two halves 1,1 in FIG. 9(*d*) are depicted as being fully intact, it is also possible that they can be partially disintegrated as depicted in FIG. 9(*c*). Even if the melted and charred material of the pitot cover halves 1,1 tend to stick to the pitot tube 100, the force of the air on the un-disintegrated surfaces 4 will tend to push the major parts of the remnants off the pitot tube 100. Any remaining material tends not to stick by virtue of the composition, and can easily be blown away by the wind on the pitot tube 100.

It should be noted that a number of different sequences from that depicted in FIGS. 9(*a*)-9(*d*) could fall within the concepts of the present invention. For example, it is preferable for the pitot cover 10 to be removed as depicted in FIG. 9(*a*), before it disintegrates in as depicted in FIG. 9(*c*). Also, the elastomeric band 2 could be removed and the gentle air pressure from a slow taxi operation to be sufficient to push apart the two halves 1, 1 of the pitot cover 10. Preferably, this would occur before hot air from the pitot 100 would disintegrate the cover 10.

Figure 13:
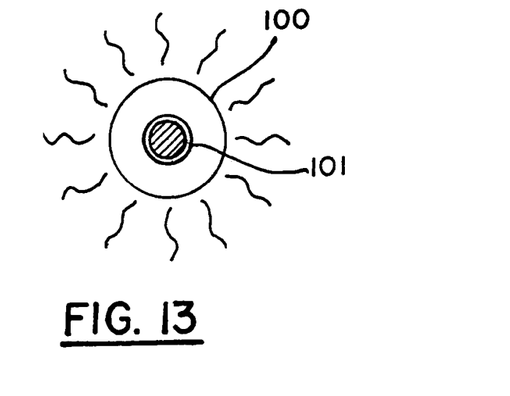
FIG. 13 is a view of the opened end of the pitot tube which constitutes a portion of the environment in which the present invention operates.

As a further enhancement to the previously described fail-safe operation of FIGS. 9(*a*)-9(*d*), low temperature failure of the elastic band greatly facilitates an early removal of the pitot tube cover 10 from the pitot probe 100. This additional preferred embodiment of the present invention permits rapid release of elastic band 2 to facilitate separation of the two halves 1, 1 of pitot cover 10. Preferably, this can be done at relatively low temperatures (150°-230° F.), which can be facilitated by a 28 volt heater 101 (in FIG. 13) in pitot tube 100.

The early separation of elastic band 2 means that the pitot tube would be released upon engine startup, or at least during the early taxi operation. Accordingly means that the pitot tube cover 10 could be easily retrieved in an undamaged condition. The desired safety results from the fail-safe operation, as previously described, and economy is achieved by being able to safely reuse the pitot tube cover 10.

The early removal of elastic band 2 is depicted in FIGS. 10-14. Instead of the normal glued "butt" connection depicted in FIGS. 1-9, the embodiment of FIGS. 10-14 relies upon the ends 21(*a*), 21(*b*) of the elastic band 2 being separated by approximately ⅛ inch when mounted on the pitot tube cover 10. This gap 200 is filled by an adhesive strip 30 constituted by a 3M EVA (eythlene vinyl acetate) Low Hot Melt. This material typically melts below 200° F., and so will release the elastomeric band 2 using only a 28 volt pitot heater 101. The subject adhesive is 3M Company catalog number: 3792LM. While this adhesive has performed well in tests, other, equivalent adhesives can be used within the concept of the present invention.

Figure 12A:
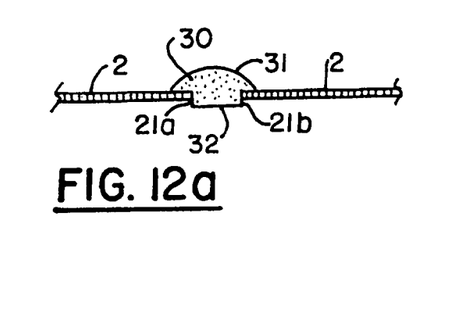
FIG. 12(a) is an edge view of a portion of the elastic band, detailing the shape and placement of an adhesive strip.
Figure 12B:
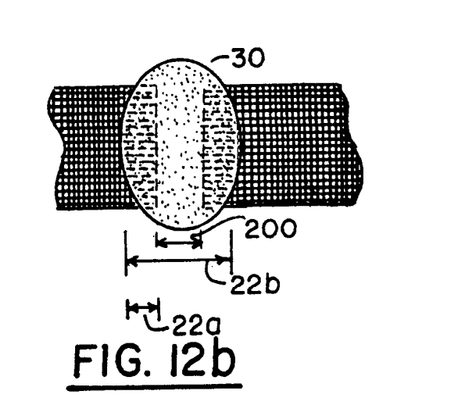
FIG. 12(b) is a top view of the structure depicted in FIG. 12(a).
Figure 12C:
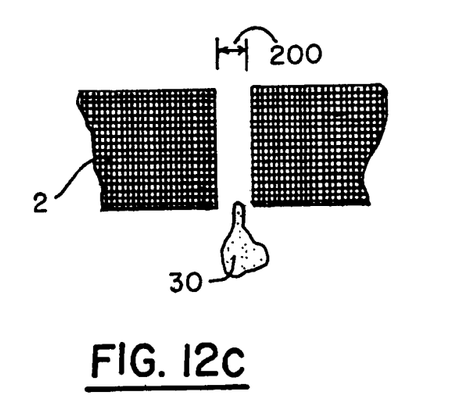
FIG. 12(c) depicts the arrangement of FIG. 12(b) once the adhesive has been removed.

The 3M EVA Low Hot Melt material is preferably applied in a 3/16-7/32 inch wide strip 30 using a 3M heated gun. Consequently, new elastomeric bands 20 can be applied easily to pitot tube covers 10 using very little effort and no specialized machinery. The shape in which the subject adhesive is preferably applied is found in FIG. 12(*a*). The shape of the adhesive strip 30 is a dome 31 on one side, and a flat side 32 on the other. The adhesive strip spans both ends 21(*a*), 21(*b*) of the elastomeric band 2, as depicted in FIG. 12(*a*). The adhesive strip 30 extends over both ends 21(*a*), 21(*b*) of elastomeric band 2 to provide "wetted sections" 22(*a*), 22(*b*) where the adhesive is melted into the fibers of the elastomeric band 2.

Figure 14:
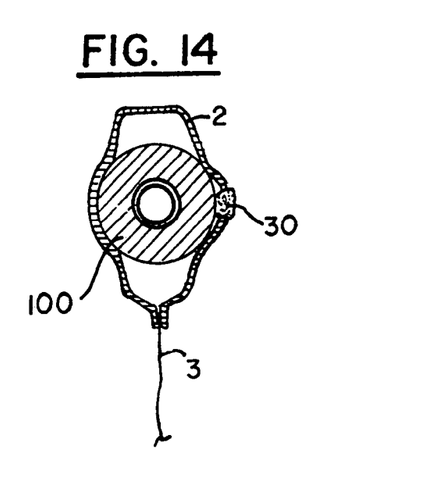
FIG. 14 depicts pitot tube of FIG. 13 with a pitot tube cover as configured in FIGS. 12(a)-12(c).

The adhesive strip 30 is placed so that the dome structure 31 rests against the surface of the pitot tube 100. This arrangement facilitates efficient heat transfer from the pitot tube 100. The result is a rapid melt off as the adhesive strip 30 is reduced into a disassociated, non-adhesive lump of material. This configuration, as depicted in FIG. 14, facilitates a more rapid and complete disintegration of the glue strip 30. The tension in the elastomeric band 2 further facilitates a tight fit and efficient heat transfer. A major advantage of the subject adhesive material is that once melted from the elastomeric band, it will not cling or stick to the pitot tube 100. This enhances the overall safety and efficiency of the inventive system. Even if adverse circumstances cause the pieces of the pitot tube cover 10 to stick to the pitot tube 100, the material of the pitot tube 10 will disintegrate as previously described. The elastomeric band 2 configuration of FIGS. 10-14 is a low-temperature removal technique that is part of the fail-safe redundancy of the overall pitot tube cover system of the present invention.

While a number of embodiments have been described by way of example, the full scope of the present invention is not limited thereto. Rather, the present invention should be construed to include any and all variations, derivations, permutations, adaptations and embodiments that might occur to one skilled in this art once having the teachings of the present invention. Accordingly, the present invention should be limited only by the following claims.

We claim:

1. A removable cover for an elongated pitot tube having an open end, said removable cover comprising:
    (a) two halves of a shell covering at least a portion of said pitot tube and said open end;
    (b) an elastomeric band having two opposed ends connected by an adhesive strip comprising material which melts at a predetermined temperature, said elastomeric band and arranged to hold said two halves of said shell together around at least a portion of said pitot tube; and
    (c) a plurality of additional structures arranged for automatically removing said cover from said pitot tube.

2. The removable cover of claim 1, wherein adhesive strip comprises an ethylene vinyl acetate.

3. The removable cover of claim 2, wherein said adhesive strip melts below a temperature of 230° F.

4. The removable cover of claim 1, wherein said elastomeric band comprises material which melts below 300° F.

5. The removable cover of claim 1, wherein said plurality of additional structures for automatically removing said cover comprise a hollow portion of said cover extending from said open end of said pitot.

6. The removable cover of claim 1, wherein said plurality of additional structures for automatically removing said cover from said pitot tube comprise at least one air foil configured to split said two halves apart under air pressure.

7. The removable cover of claim 1, wherein said plurality of additional structures for automatically removing said cover from said pitot tube comprise shells made of a material frangible at 300°-500° F.

8. The removable cover of claim 7, wherein said materials of said shells comprise approximately: 67.2% walnut shells and wood flower; 27% polypropylene; and, 5.8% sodium serrate.

9. A method of removing a pitot tube cover from a pitot tube, where said cover is held to at least a portion of said pitot tube by an elastomeric band having opposing ends held together by an adhesive strip so that said elastomeric band is under tension, said method comprising the steps:
    (a) heating said pitot tube;
    (b) melting said adhesive strip to release said elastomeric band.

10. The method of claim 9, wherein said step (a) of heating is to a temperature of less than 230° F.

11. The method of claim 10, wherein said step (a) of heating is accomplished by applying 28 volts to said pitot tube.

12. A binding structure for holding and releasing a pitot tube cover from a pitot tube, where said pitot tube cover comprises two halves held together over said pitot tube by said binding structure, said binding structure comprising:
    (a) an elastomeric band arranged around said pitot tube cover with two facing opposing ends having a predetermined gap between said opposing ends; and
    (b) an adhesive strip arranged between and holding said opposing ends together said adhesive strip comprising material which melts at a predetermined temperature to release said elastomeric band.

13. The binding structure of claim 12, wherein said adhesive strip comprises material which melts at less than 230° F.

14. The binding structure of claim 13, wherein said adhesive strip overlaps both said two opposing ends of said elastomeric band.

15. The binding structure of claim 14, wherein said adhesive strip comprises an ethylene vinyl acetate.

16. The binding structure of claim 15, wherein said adhesive strip is formed in a configuration having a concave dome on one side and a substantially flat surface on an opposing side.

17. The binding structure of claim 16, wherein concave dome of said adhesive strip is arranged in contact with said pitot tube.

18. The binding structure of claim 12, wherein said two opposing ends of said elastomeric band are separated by a space of substantially ⅛ inch, and said strip has a width of substantially 3/16-7/32 inch.

* * * * *